INVENTOR
EMANUEL SCHNITZER

Feb. 23, 1965    E. SCHNITZER    3,170,471
INFLATABLE HONEYCOMB
Filed April 23, 1962    2 Sheets-Sheet 2
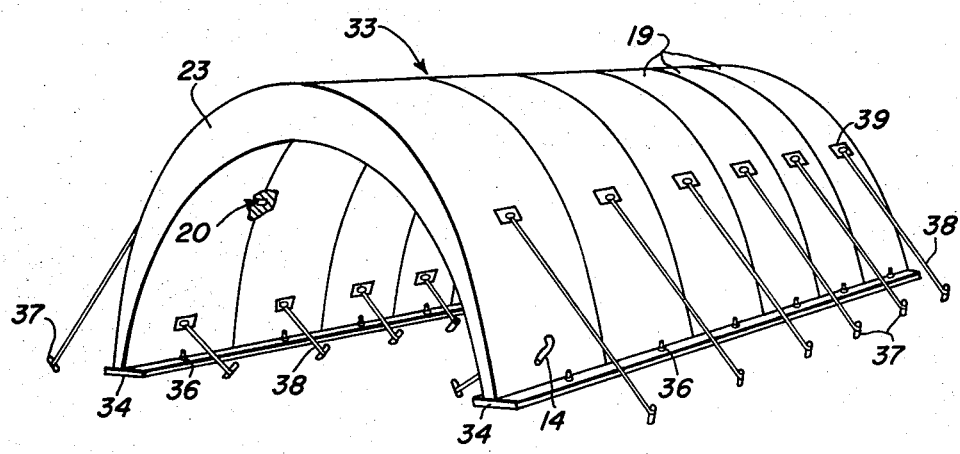
FIG. 5
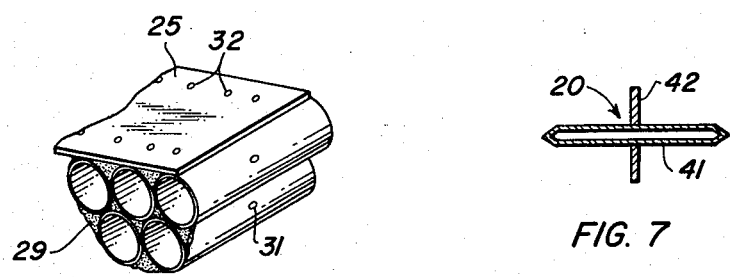
FIG. 6
FIG. 7
INVENTOR
EMANUEL SCHNITZER
BY
ATTORNEYS

United States Patent Office 3,170,471
Patented Feb. 23, 1965

3,170,471
INFLATABLE HONEYCOMB
Emanuel Schnitzer, Newport News, Va., assignor to the United States of America as represented by the Administrator of the National Aeronautics and Space Administration
Filed Apr. 23, 1962, Ser. No. 189,648
7 Claims. (Cl. 135—1)
(Granted under Title 35, U.S. Code (1952), sec. 266)

The invention described herein may be manufactured and used by or for the Government of the United States of America for governmental purposes without the payment of any royalties thereon or therefor.

This invention relates generally to inflatable structures, and more particularly to durable, lightweight, inflatable honeycomb panel elements making up such structures, which are foldable for transit into a compact package and inflatable, when ready for use, to assume an erected rigid configuration useful in numerous applications such as, for example, in building structures, bridge construction, orbital parabolic dish or flat disk light and radio wave reflectors, space stations, and the like.

Inflatable structures designed according to current practice generally are made up of a plurality of inflatable panel or other celluar elements; each of which is internally or externally braced or supported to insure a rigid configuration when the structure is inflated. These braces or supports add weight, which in certain applications may create critical problems, and also add bulk, which does not permit compact packaging or storage when the structure is deflated. Such bulky and weighty structures obviously are not practical for use as spatial solar energy collectors or space reflectors, for example, where satisfactory performance is directly related to the conductive or reflective surface area involved, which can be substantially independent of weight. Since weight and bulk are very critical problems in the design of payloads for carrier vehicles employed in space exploration, due to the limited capabilities of present day rockets, it is desirable to obtain maximum area for minimum weight and collapsed bulk in the production of certain space objects that are to be placed in orbit about the earth. Accordingly, structures of the type contemplated by the present invention are considered quite useful in permitting ultimately large building structures, lightweight space satellites, and solar collectors, to be stored in a compact state within a payload portion of a carrier vehicle and later erected in space to assume any predetermined rigid configuration when inflated.

Accordingly, it is an object of the present invention to provide a strong and durable lightweight, inflatable structure foldable into a compact unit.

Another object of the instant invention is the provision of a new and improved inflatable reinforced panel construction.

A further object of this invention is the provision of a honeycomb core element for an inflatable panel useful in the construction of a lightweight space satellite.

A still further object of the present invention is the provision of a fluid tight, inflatable, building panel element erectable to a rigid configuration.

An additional object of the present invention is to provide a new and improved structural panel or envelope.

Another additional object of this invention is the provision of an improved method of making a folded inflatable honeycomb panel structure.

According to the present invention, the foregoing and other objects are attained by providing a collapsible, inflatable structure constituted by panel or envelope elements each having flexible outer skin members and a flexible perpendicularly disposed honeycomb core element placed between the skin members to divide the panel or envelope into a plurality of cells. The material of which the entire panel structure of the present invention is fabricated may be a thin, lightweight, flexible plastic film or sheet which may have a thin layer of metal placed thereon to strengthen the plastic, and which may be used to reflect light and radio waves when required. The side wall between each adjoining cell of the honeycomb reinforcing core element of the panel of the present invention is provided with at least one side wall aperture for fluid communication between the individual adjacent cells, while the external skin members are, obviously, fluid tight. The panel or envelope structure of the present invention is capable of being folded into a compact package occupying approximately 5 percent of its fully inflated volume and which, when ready for use, may be erected into a rigid configuration by any suitable inflating medium such as, for example, pressurized gas, water vapor, sublimating solids, or plastic foam. Also, any desired final erected structural configuration may be formed, according to the present invention, by adhesively bonding any desired number and shapes of envelopes together, and by establishing fluid communication between adjacent envelopes by providing therebetween a simple two-way valve element to permit expansion of an entire configuration through a single external fluid inlet or conduit.

A more complete appreciation of the invention and many of the attendant advantages thereof will be readily apparent as the same becomes better understood by reference to the following detailed description when considered in connection with the accompanying drawings wherein:

FIG. 5 is a perspective view of one form of building structure embodying the panel element of the present invention;

FIG. 6 shows a modification of the honeycomb core useable in the panel element of the present invention; and, FIG. 7 is a cross-sectional view of a two-way valve assembly useable to provide fluid communication between adjoining panel elements of the present invention.

Figure 1:
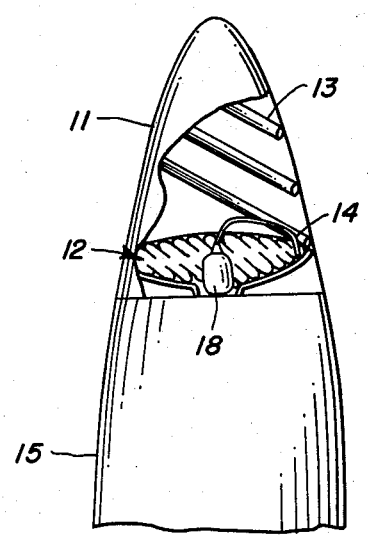
FIG. 1 is a side elevational view of a carrier vehicle payload nose cone, with parts broken away to show packaged therein a folded reflector space satellite constructed in accordance with the present invention.

Referring now more particularly to the drawings, wherein like reference numerals designate identical parts throughout the several views, and more particularly to FIG. 1, there is shown a carrier vehicle payload nose cone 11 having a folded expandable reflector space satellite, generally designated by the reference numeral 12, positioned therein. Satellite 12 is adapted to be forcibly ejected by the operation of a coil spring 13 from nose cone 11 for spatial erection when nose cone 11 is separated from carrier vehicle 15. A tubular conduit element 16 is connected between an opening 14 in expandable satellite structure 12 and an inflation medium source, such as, for example, gas bottle 18, for expandable erection of satellite 12 when separated from nose cone 11. Suitable valve means, not shown, are positioned within conduit 16 and operate to admit gas into satellite 12 when it is separated from nose cone 11. Further suitable means, not shown, are provided to detach conduit element 16 from gas bottle 18 to seal element 16 when the inflating medium is exhausted, or when the pressure within satellite 12 reaches a predetermined maximum.

Figure 2:
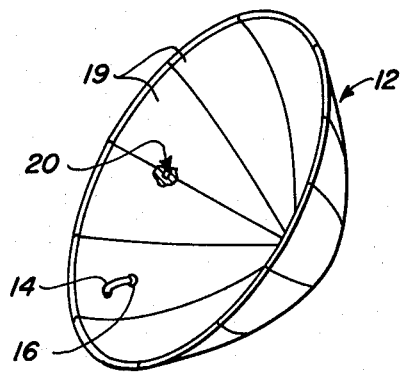
FIG. 2 is an isometric view of the inflated reflector space satellite shown folded in FIG. 1.

As shown more particularly in FIG. 2, satellite 12 is composed of a plurality of panels or envelopes 19, secured together by a conventional flexible adhesive to form the desired satellite configuration, with fluid communication between the individual envelopes 19 being provided, for example, by a two-way valve assembly generally designated by the reference numeral 20, to be more completely described hereinafter. Alternatively, the entire configuration of satellite 12 may be formed of a single envelope when so desired. The embodiment of the invention illustrated in FIGS. 1 and 2 is deemed particularly useful as a solar energy collector or space reflector for electromagnetic waves.

Figure 3:
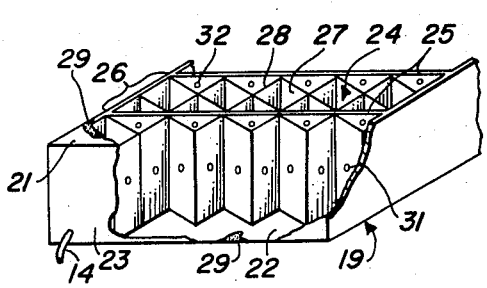
FIG. 3 is an oblique view of one embodiment of a panel element, with parts broken away, used in fabricating the satellite structure shown in FIGS. 1 and 2.
Figure 4:
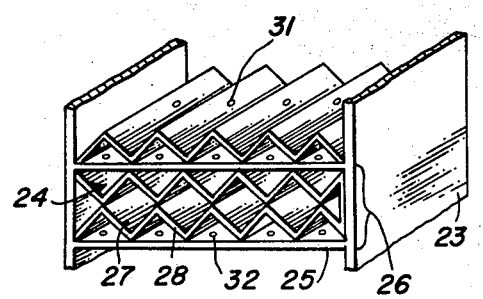
FIG. 4 is a fragmentary oblique view of a portion of the panel element shown in FIG. 3.

Referring now more particularly to FIGS. 3 and 4, the individual panels or envelopes 19 of satellite 12 are shown as composed of spaced, substantially parallel external skin 21 and internal skin 22, a peripheral wall or skin 23, and an intermediate reinforcing honeycomb core element generally designated by reference numeral 24. Core element 24 is composed of a plurality of perforated parallel spacer sheets 25 perpendicularly disposed between and bonded by means of a conventional flexible adhesive such as, for example, a low temperature thermosetting resin 29, in fluid tight relationship with skins 21, 22, as well as with peripheral wall 23 at the points of contact therewith, to form a plurality of rectangularly shaped compartments designated by reference numeral 26. A sheet of redoubled sinuous material 28 having half-lengths connected one to the other at confronting nodal points divides each rectangular shaped compartment 26 into a plurality of honeycomb cells 27. The individual honeycomb cells 27 are formed by bonding with adhesive 29 half-lengths of sheet 28 to parallel sheets 25 at spaced intervals, and by bonding sheet 28 in fluid-tight engagement with skins 21, 22 and peripheral wall 23 at the points of contact therewith. By selecting the points of contact that sheet 28 makes with the other structure, the cross-sectional area of honeycomb cells 27 may be readily controlled. A sheet 28 may be preformed in any desired sinuous shape and may thus provide honeycomb cells 27 of triangular, square, circular, or other polygonal cross-sectional shapes, as desired.

Alternatively, referring now to FIG. 6, the honeycomb cells may be formed individually and bonded to each other and to spacer sheets 25 by flexible adhesive 29, which is applied to the surface of skins 21 and 22 prior to assembly of spacer sheets 25 and honeycomb cells 27. The external surface of both end portions of each individual cell wall may also be coated with additional adhesive 29 to assure an adequate bond between each individual cell, when so desired, although it is apparent that some adhesive will normally flow between the individual cells during curing or setting of the adhesive on skins 21 and 22 after assembly of the panel or envelope. The assembly of the panel by inserting individual preformed cells is required when the cells are of circular cross-sectional configuration, and this process may also be desirable for assembly of other cell configurations, under some circumstances.

Each individual cell 27 in the final assembly of a panel or envelope 19 is provided with at least one aperture 31 in the side wall thereof for fluid communication with each adjacent cell. Apertures 31 may be formed in sheet 28, either prior to assembly of cells 27 or after the cells are formed. Also, referring once again to FIGS. 3 and 6, it will be seen that apertures or perforations 32 in spacer sheets 25 provide fluid communication between respective rectangular shaped compartments 26.

The various skin sheets for panels or envelopes 19, and the honeycomb core elements therefor, are all preferably formed from the same strong, flexible, and lightweight material. One such material that has proved particularly suitable for this purpose is Mylar sheet or film, although other lightweight flexible plastics may be employed. Mylar is a product of E. I. du Pont de Nemours, Inc., of Wilmington, Delaware, and is formed of highly polymeric long-chain polyesters of dicarboxylic acid and glycol. This particular material has a high tensile and impact strength, and remains flexible and stable over a range of temperatures from minus 60 degrees C. to 150 degrees C. To provide a final rigid configuration, as well as to provide a reflective surface on the Mylar film, a thin continuous lightweight metallic coating such as, for example, aluminum, is deposited over one or both sides of the Mylar film. This metallic coating may be provided in any conventional manner such as, for example, by vapor deposition, or by bonding one or more metallic sheets to one or more sides of the plastic with a suitable adhesive to thereby form either a two or three ply laminated structure. Laminated materials of this type have an inherent stiffness, although they are readily workable into desired shapes. Further, such materials, upon being subjected to loading developing tensile stresses therein exceeding the elastic limit of the metallic layer but less than the ultimate tensile strength thereof, will develop a substantial rigidity due to permanent set in the metallic layer. It has been found that micrometroid puncture of inflated structures may permit rapid escape of the inflation medium therefrom. Under these circumstances such inflated structures, in the absence of the honeycomb internal bracing configuration of the present invention, may collapse despite the permanent set developed by the metallic layer or layers of the laminated material under the influence of solar pressure. However, when the honeycomb reinforced panel members of the present invention are utilized in a space vehicle, the material 28 in the wall of each individual honeycomb cell 27 develops permanent set and resists any tendency of either skin 21 or skin 22 to collapse. In addition to the forces exerted on skins 21 and 22 by material 28, additional similar forces are exerted on the inner surfaces of the skins to prevent collapse thereof by parallel spacer elements 24. This combination of internal forces in panel 19 results in the maintenance of a predetermined final configuration for each individual panel in an assembly, such as satellite 12 after its inflation, even if the inflating medium is subsequently removed or escapes.

FIG. 5 of the drawings illustrates a collapsible building structure, generally designated by the reference numeral 33, useful, for example, as an aircraft hanger. Building 33 employs a plurality of panels or envelopes 19, as hereinbefore described, bonded together by a suitable adhesive. Fluid communication is established between adjoining panels 19 as, for example, through valve assemblies 20. Ground engaging flaps 34, having a plurality of spaced openings 36 therein through which ground stakes or anchors may be passed, are bonded by a suitable adhesive to end wall portions of envelopes 19. A plurality of guy wires 38, when required, may be connected to ring members 39, both internally and externally of structure 33, and to ground stakes 37, as additional supports for structure 33 for withstanding wind forces. Also, if desired, additional panels of suitable configuration, not shown, may be bonded to peripheral wall 23 of end panels 19 to provide front and rear end walls for the building structure 33. Although building 33 is shown as having a continuously curved roof similar to those of Quonset huts, other building configurations, obviously, may be formed within the scope of this invention by selecting other desired shapes for panels 19. Further, where a more permanent building is desired, it is within the scope of this invention to employ a plastic foam or any other suitable initially flowable material as the inflating medium for structure 33.

The thickness of each individual panel 19 may be easily controlled by selecting the desired height of the honeycomb cells 27 in adjacent rectangular compartments 26 while providing the appropriate varying height for peripheral wall 23. The height of the individual honeycomb cells may vary from a fraction of an inch to several feet depending upon the type of final configuration desired, and the environmental conditions expected where the structure is to be used. The width of each panel 19 is, obviously, controlled by the width or external surface area of skins 21 and 22.

Referring now to FIG. 7, one form of suitable valve assembly 20 for providing fluid interconnection between two adjacent panel members 19 consists of a somewhat rigid and slightly flexible tubular needle 41, having a thin flap 42 of plastic or other suitable slightly flexible material securely positioned transversely thereto at about the center thereof. When it is desired to secure two or more adjoining envelopes 19 for fluid communication, needle 41 is inserted through the adjacent peripheral walls 23 of envelopes 19, and flap 42 is securely bonded to the respective peripheral walls by means of a suitable adhesive.

To assemble a panel or envelope of the present invention, referring now back to FIG. 3, skin 21 is placed flat over a work table or other suitable area, and a suitable adhesive coating 29 applied to the entire exposed surface. Overlap sections of peripheral wall or skin 23 are then bonded to skin 21 to form an open box-type configuration. Perforated spacer sheets 25, which are cut slightly larger than the width of skin 21 and wider than the height of peripheral wall 23 to provide an overlap at the ends and sides thereof, are next bonded at spaced intervals to peripheral wall 23 and skin 21; thereby dividing the entire area into a plurality of rectangularly shaped compartments 24. A sheet of material 28 of the same height as peripheral wall 23, but having considerable length, is then sinuously folded along a lengthwise portion thereof and bonded at spaced intervals to the entire length of one surface of a first spacer sheet 25, with the portion of sheet 28 between the individual bonds forming with spacer sheet 25 a plurality of cells of substantially triangular cross-sectional configuration. The excess of sheet 28 extends along the edge of peripheral wall 23 to a second spacer sheet 25 and then is sinuously folded along the remainder of the length thereof and bonded to a second perforated spacer sheet 25 at equally spaced intervals, forming a second set of cells having substantially triangular cross-sectional area. The apexes of both sets of triangular cells are adhesively joined to complete the cellular structure of one compartment 24 within the panel 19. This procedure is repeated until the entire panel core configuration is complete, at which time skin 22 with an adhesive 29 coated on one surface thereof is secured to seal the assembled structure in fluid tight relationship, with the exception of conduit 14 which may extend through either of skins 21, 22, or 23, as desired. As mentioned heretofore, the assembled structure can be folded, for example, in accordion or map fashion, into a compact package occupying approximately 5 percent of the final inflated volume. Any air trapped within the core during assembly is bled off during the folding operation through conduit 14 by way of the individual perforation or apertures within spacer sheets 25 and sheet material 28 which, together, form the individual honeycomb cells 27. A vacuum pump may be attached to conduit 14 to aid in removal of any trapped air in the panel during fabrication. When it is desired to use more than one panel or envelope 19 in forming a particular configuration, the panels are placed in fluid communication with each other by suitable means, such as two-way valve assemblies 20, with the adjacent peripheral wall or skins 23 being penetrated by opposite ends of hollow needle 41 and adhesively bonded to each other and to thin plastic flap 42 of valve assembly 20. The overall size of flap 42 is controlled so as to be less than the height of peripheral wall members 23 to effect a smooth surface seal between the adjacent peripheral wall members. The assembled structure may then be placed in a low temperature oven to effect curing of the low temperature thermosetting resin adhesive 29 when this type adhesive is employed. The physical characteristics of the material making up the panel permits the complete structure to be substantially flattened and folded, end to end, and side to side, into a compact package constituting a volume of only approximately 5 percent of the total inflated volume of the panel. Although this folding creates numerous wrinkles, the wrinkles are completely removed when the structure is inflated to an internal pressure sufficient to stress the skin metallic layers beyond the yield point.

Obviously, other methods of assembly may be employed within the scope of this invention. For example, sheet material 28 may be divided into honeycomb cells within two or more spacer sheets 25 and assembled as units to the adhesive coated skin 21, within the confines of peripheral wall 24, and then covered by skin 22.

Also, as mentioned heretofore, and as shown in FIG. 6, the honeycomb cells can be formed and positioned within the compartments formed by spacer sheets 25 individually, when so desired.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An inflatable envelope panel, comprising: a flexible internal skin, a flexible external skin, and a flexible peripheral wall member interconnecting said internal skin to said external skin in spaced relationship to form an enclosed envelope; a flexible bracing core element positioned within and secured to the inner surfaces of said enclosed envelope, each said internal skin, external skin, peripheral wall, and said bracing core being constructed of a metal-plastics laminate and having the inherent physical property characteristic of developing sufficient tensile stress therein when said envelope is inflated to resist subsequent envelope collapse; and means for introducing an inflation medium into said envelope.

2. An inflatable panel, comprising: a flexible internal skin, a flexible external skin spaced from said internal skin, and a flexible peripheral wall member interconnecting said skins to form an enclosed space; a flexible honeycomb bracing core element disposed within said enclosed space and attached to the inner surfaces of said skins and said peripheral wall member, said honeycomb core element including a plurality of perforated spacer elements perpendicularly secured to said inner surfaces of said skin members and said peripheral wall and dividing the space bounded by said skins and said peripheral wall members into a plurality of substantially rectangularly shaped compartments, each said rectangularly shaped compartment being divided into a plurality of honeycomb cells by a sheet of material bonded to at least one of said perforated spacer elements at spaced intervals thereon; and means for introducing an inflation medium into said panel.

3. An expandable structure adapted to be folded into a volume approximately 5 percent of its expanded volume, comprising: a plurality of inflatable panels joined together to assume, when inflated, a preselected rigid and substantially permanent configuration; each of said panels comprising a flexible internal skin, a flexible external skin, a flexible peripheral wall member, and a flexible core bracing element, said core element being securely bonded within the panel to the inner surfaces of said skin members and said peripheral wall member, said core element including a plurality of parallelly disposed perforated spacer elements dividing said core element into a plurality of substantially rectangularly shaped compartments, each of said rectangularly shaped compartments including cell wall means dividing the compartment into a plurality of individual honeycomb cells perpendicularly disposed with respect to said skin members, each honeycomb cell being provided with at least one wall aperture for fluid communication with each adjacent cell; and means for introducing an inflation medium into each of said inflatable panels.

4. An inflatable structure comprising:
a flexible internal skin,
a flexible external skin,
a flexible peripheral wall member interconecting said internal skin to said external skin in spaced relationship to form an enclosed envelope;
a flexible brace positioned within and secured to the inner surfaces of said enclosed envelope;
said flexible brace including:
   (a) a plurality of spacer elements perpindicularly secured to the inner surfaces of said skins and said peripheral wall member for dividing said enclosed envelope into a plurality of compartments, and
   (b) a sheet of redoubled sinuous material having half-lengths connected one to the other at confronting nodal points in each said compartment to divide each compartment into a plurality of honeycomb cells,
inflation means for inflating said envelope with an inflation medium,
each of said internal skin, external skin, peripheral wall and said flexible brace being constructed of a metal-plastics laminate,
said laminate having the inherent physical property characteristic of developing tensile stresses therein, upon said envelope being inflated to its final configuration, sufficient to resist collapse of said envelope upon subsequent removal of said inflation medium.

5. The inflatable panel of claim 2 wherein:
a metal-plastics laminate material is employed for each of said internal skin, said external skin, said peripheral wall member, said perforated spacer elements and said sheets of material forming said honeycomb cells,
said metal-plastics laminate material having the inherent physical property characteristic of developing a permanent set therein when inflated by said inflation medium to be stressed beyond the elastic limit thereof to a point less than its ultimate tensile strength.

6. The expandable structure of claim 3 wherein said means for introducing an inflation medium into each of said inflatable panels includes:
a two-way valve assembly interconnected between the adjacent peripheral walls of juxtaposed panels to provide for fluid communication therebetween,
said valve assembly including
   (a) a unitary tubular needle, and
   (b) a thin flexible flap transversely exteriorly secured to said needle intermediate the ends thereof, said flap being adhesively bonded to adjacent peripheral wall members of said juxtaposed panels,
and
a conduit connected between at least one of said panels and a central source of inflation medium.

7. An inflatable structure adapted to assume a rigid and substantially permanent configuration when inflated and capable of reflecting electromagnetic rays from the surface thereof, comprising:
a flexible internal skin,
a flexible external skin,
a flexible peripheral wall member interconnecting said internal skin to said external skin in spaced relationship to form an enclosed envelope;
a flexible brace positioned within and secured to the inner surfaces of said enclosed envelope,
said flexible brace including:
   (a) a plurality of spacer elements perpendicularly secured to the inner surfaces of said skins and said peripheral wall member for dividing said enclosed envelope into a plurality of compartments, and
   (b) a sheet of redoubled sinuous material having half-lengths connected one to the other at confronting nodal points in each said compartment to divide each compartment into a plurality of honeycomb cells.

References Cited by the Examiner

UNITED STATES PATENTS

| | | | |
|---|---|---|---|
| 468,455 | 2/92 | Giessmann | 135—1 |
| 1,754,784 | 4/30 | Borsodi | 156—292 |
| 1,920,961 | 8/33 | Anderson | 156—292 |
| 2,477,852 | 8/49 | Bacon | 156—292 X |
| 2,543,879 | 3/51 | Stuckey | 156—292 X |
| 2,698,020 | 12/54 | Phane | 135—1 |
| 2,702,580 | 2/55 | Bateman | 161—165 |
| 2,718,014 | 9/55 | Mizrach et al. | 135—1 |
| 2,812,769 | 11/57 | Schaefer et al. | 135—1 |
| 2,819,724 | 1/58 | Barker | 135—1 |
| 2,888,675 | 5/59 | Pratt et al. | 343—915 X |
| 2,895,490 | 7/59 | Dimond | 135—1 |
| 2,934,075 | 4/60 | Richardson et al. | 135—1 |
| 2,977,596 | 3/61 | Justice | 343—915 |

FOREIGN PATENTS

| | | |
|---|---|---|
| 1,194,773 | 5/59 | France. |

HARRISON R. MOSELEY, *Primary Examiner.*